(12) United States Patent
Kim et al.

(10) Patent No.: US 9,469,282 B2
(45) Date of Patent: Oct. 18, 2016

(54) CLUTCH OPERATING SYSTEM

(71) Applicant: Hyundai Motor Company, Seoul (KR)

(72) Inventors: Bum Jun Kim, Whasung-Si (KR); Eun Sik Kim, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 56 days.

(21) Appl. No.: 14/485,359

(22) Filed: Sep. 12, 2014

(65) Prior Publication Data

US 2015/0142272 A1 May 21, 2015

(30) Foreign Application Priority Data

Nov. 20, 2013 (KR) .......................... 10-2013-0141441

(51) Int. Cl.
| | |
|---|---|
| *B60K 23/02* | (2006.01) |
| *B60T 7/12* | (2006.01) |
| *B60W 10/02* | (2006.01) |
| *B60W 10/18* | (2012.01) |
| *B60W 10/06* | (2006.01) |
| *F16D 25/08* | (2006.01) |

(52) U.S. Cl.
CPC .................. *B60T 7/12* (2013.01); *B60T 7/122* (2013.01); *B60W 10/02* (2013.01); *B60W 10/06* (2013.01); *B60W 10/182* (2013.01); *B60W 2540/14* (2013.01); *B60Y 2300/436* (2013.01); *F16D 2025/081* (2013.01); *F16D 2300/18* (2013.01)

(58) Field of Classification Search
CPC ........... B60W 2540/14; B60W 10/02; B60W 10/08; B60W 10/06; B60W 10/182; B60W 10/192; B60T 7/12; B60T 7/122; B60Y 2300/436; F16D 2025/081; F16D 2300/18

USPC .......................................................... 701/48
See application file for complete search history.

(56) References Cited

U.S. PATENT DOCUMENTS 4,705,151 A * 11/1987 Leigh-Monstevens B60K 28/00
192/111.12
2005/0000772 A1 * 1/2005 Wohner ................ F16D 25/088
192/30 W (Continued)

FOREIGN PATENT DOCUMENTS

| CN | 202806383 U | * | 3/2013 |
|---|---|---|---|
| KR | 20-1998-043577 U | | 9/1998 |
| KR | 10-2006-0130289 A | | 12/2006 |

OTHER PUBLICATIONS

Machine Translation: Mengli, Clutch Pedal Assembly, CN202806383U, Mar. 2013, Chinese Patent Office.*

(Continued)

*Primary Examiner* — John Q Nguyen
*Assistant Examiner* — Nadeem Odeh
(74) *Attorney, Agent, or Firm* — Morgan, Lewis & Bockius LLP (57) ABSTRACT

Disclosed are a clutch operating system and a driving method of a clutch operating system. The system may include a clutch master cylinder connected to a clutch pedal and generating hydraulic pressure by operation of the clutch pedal, a piston provided in the clutch master cylinder and reciprocally moving according to the operation of the clutch pedal, and an integrated sensor detecting a stroke of the piston, selectively supplying power to a starting motor according to the stroke of the piston, and providing the stroke of the piston to an ECU (electronic control unit) to control a transmission and an EPB (electronic parking brake).

5 Claims, 6 Drawing Sheets (56) References Cited

U.S. PATENT DOCUMENTS

| | | | | |
|---|---|---|---|---|
| 2006/0243572 A1* | 11/2006 | Hornbrook | ............ | H03K 17/97 200/82 D |
| 2012/0138435 A1* | 6/2012 | Lee | ........................ | B60K 23/02 200/61.89 |
| 2014/0174894 A1* | 6/2014 | Park | ..................... | B60K 41/225 200/61.89 |

OTHER PUBLICATIONS

TRW Automotive, Body Control Systems—Clutch Sensor, 2012, TRW Automotive.*

Wohner et al., Integrated Hall Displacement Sensors for Clutches, Feb. 2011, Springer Automotive Media, Industry Sensorics—ATZ Worldwide eMagazine, vol. 113, Issue 2, pp. 50-52.*

FTE Automotive, Displacement and Switch-Point Sensors—Product Guide, FTE Automotive GmbH.*

Beru, Non-Contacting, Wear-Free Displacement Sensors in Clutch and Brake Systems, 2002, ATZ Worldwide, vol. 104.*

Welter et al., Clutch Operation, 2010, Schaeffler Symposium 2010.*
TE Connectivitiy, Clutch Sensor Technologies—Product Guide, TE Connectivity Ltd.*

\* cited by examiner

CLUTCH OPERATING SYSTEM

CROSS-REFERENCE TO RELATED APPLICATION

The present application claims priority of Korean Patent Application Number 10-2013-0141441 filed on Nov. 20, 2013, the entire contents of which application are incorporated herein for all purposes by this reference.

BACKGROUND OF INVENTION

1. Field of Invention

The present invention relates to a clutch operating system. More particularly, the present invention relates to a clutch operating system in which a clutch switch, an ignition lock switch, and an EPB switch are integrated, such that cost can be reduced and assemblability can be improved.

2. Description of Related Art

Figure 1:
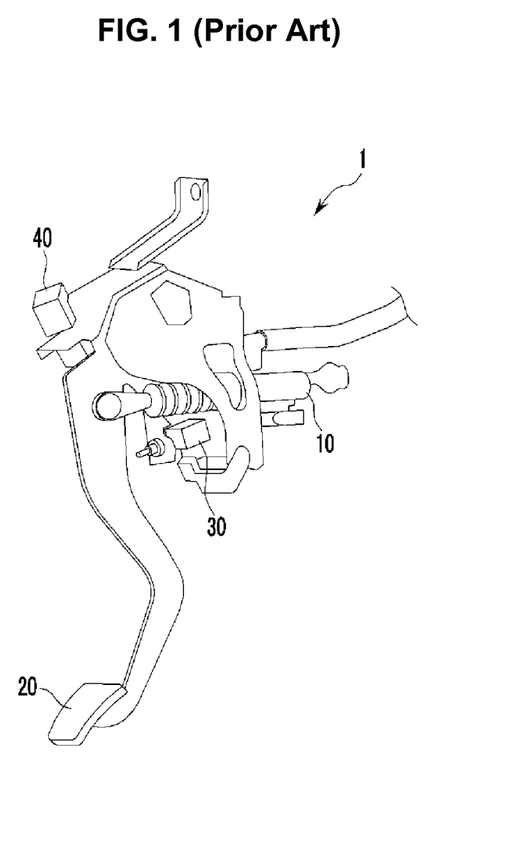
FIG. 1 is a perspective view illustrating a clutch operating system according to prior art.

FIG. 1 is a perspective view illustrating a clutch operating system according to prior art. Generally, as shown in FIG. 1, a clutch of a vehicle having a manual transmission includes an ignition lock switch 30 that is turned on or off according to operation of a clutch pedal 20, clutch switch 40, and a stroke sensor 10 for an electronic parking brake (EPB).

The ignition lock switch 30 protects starting when a driver does not step on the clutch pedal 20, the clutch switch 40 controls a transmission according to operation of the clutch pedal 20, and the stroke sensor 10 controls the EPB according to operation of the clutch pedal 20.

As described above, according to the prior art, the ignition lock switch 30, the clutch switch 40, and the stroke sensor 10 must be provided in the clutch pedal 20, such that cost is increased according to an increased number of parts and assembly time is increased.

Also, since the ignition lock switch 30 and the clutch switch 40 are mechanical switches, noise is generated when the ignition lock switch 30 and the clutch switch 40 operate.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a clutch operating system that can reduce cost by decreasing a number of parts and can reduce assembly time. Further, the present invention minimizes operation noise generated at an ignition lock switch and a clutch switch.

Various aspects of the present invention provides a clutch operating system that may include: a clutch master cylinder connected to a clutch pedal and generating hydraulic pressure by operation of the clutch pedal; a piston provided in the clutch master cylinder and reciprocally moving according to the operation of the clutch pedal; and an integrated sensor detecting a stroke of the piston, selectively supplying power to a starting motor according to the stroke of the piston, and providing the stroke of the piston to an ECU (electronic control unit) to control a transmission and an EPB (electronic parking brake).

The integrated sensor may include an ignition lock switch selectively supplying the power to the starting motor, and a stroke sensor detecting the stroke of the piston by detecting a magnetic force generated at a magnet provided in the piston.

Power may be supplied through a first power terminal provided in the integrated sensor, and power output to the ECU through a clutch terminal may be protected when the stroke of the piston detected by the integrated sensor reaches a first predetermined value. The first predetermined value may be about 50% of a full stroke of the piston.

The ignition lock switch may receive power through a second power terminal provided in the integrated sensor, and supply power to the starting motor through a starting terminal when the stroke of the piston detected by the integrated sensor reaches the first predetermined value. The second predetermined value may be about 85% of a full stroke of the piston.

Power supplied to the first power terminal and power supplied to the second power terminal may be separated from each other.

Various other aspects of the present invention provides a driving method of a clutch operating system that may include: measuring a stroke of a piston provided in a clutch master cylinder according to operation of a clutch pedal; supplying the stroke of the piston to an ECU through an EPB terminal; protecting power outputted from a clutch terminal when the stroke of the piston reaches a first predetermined value; and supplying power to a starting motor when the stroke of the piston reaches a second predetermined value.

The first predetermined value may be about 50% of a full stroke of the piston. The second predetermined value may be about 85% of a full stroke of the piston.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The drawings are provided for reference in describing exemplary embodiments of the present invention, and the spirit of the present invention should not be construed only by the accompanying drawings.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s)

to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In describing the present invention, parts that are not related to the description will be omitted. Like reference numerals generally designate like elements throughout the specification. In addition, the size and thickness of each configuration shown in the drawings are arbitrarily shown for better understanding and ease of description, but the present invention is not limited thereto. In the drawings, the thickness of layers, films, panels, regions, etc., are exaggerated for clarity.

Figure 2:
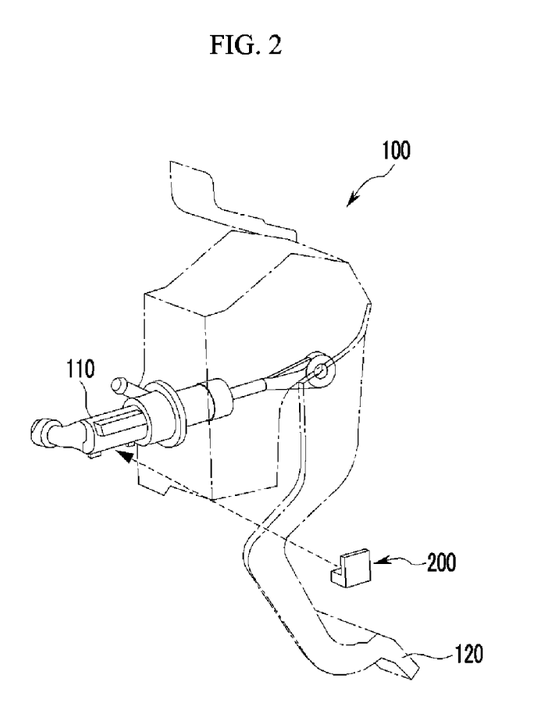
FIG. 2 is a perspective view illustrating an exemplary clutch operating system according to the present invention.

FIG. 2 is a perspective view illustrating a clutch operating system 100 according to various embodiments of the present invention. As shown in FIG. 2, a clutch pedal 120 operable by a driver in order to operate a clutch, a clutch master cylinder (typically called a CMC) 110 that generates hydraulic pressure by the operation of the clutch pedal 120, a clutch release cylinder (typically called a CRC) that operates the clutch of the manual transmission by the hydraulic pressure of the clutch master cylinder, and an integrated sensor 200 provided in the clutch master cylinder 110 are included in the clutch operating system 100.

Figure 3:
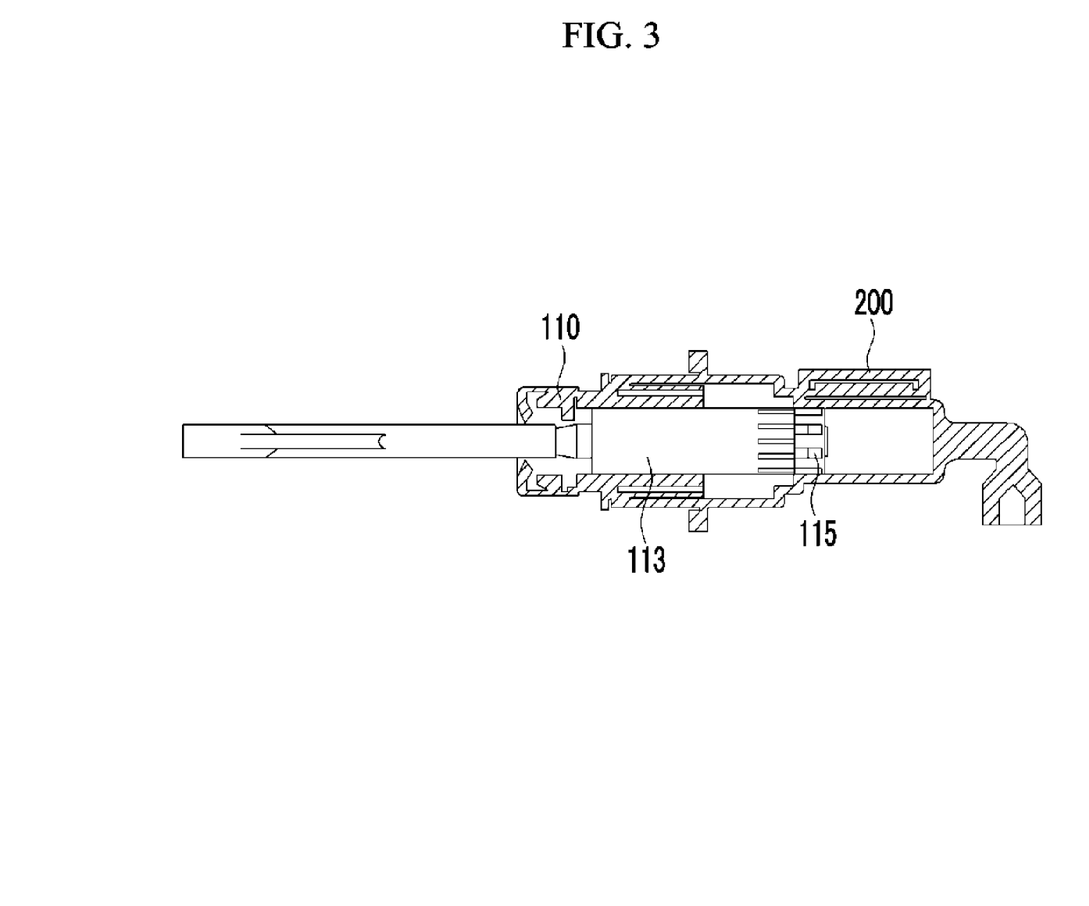
FIG. 3 is a cross-sectional view illustrating an exemplary clutch master cylinder according to the present invention.

FIG. 3 is a cross-sectional view illustrating a clutch master cylinder 110 according to various embodiments of the present invention. As shown in FIG. 3, the master cylinder includes a hollow shaped cylinder and a piston 113 disposed in the cylinder. Hydraulic pressure for driving the clutch is generated by reciprocal motion of the piston 113 in the cylinder.

The integrated sensor 200 detects a stroke of the piston 113 provided in the clutch master cylinder 110, and the integrated sensor 200 is provided in the clutch master cylinder 110. For detecting the stroke of the piston, a magnet 115 is provided in the piston 113 and a stroke sensor 210 (see FIG. 4) is provided in the integrated sensor 200. The stroke sensor 210 detects the stroke of the piston by detecting a change of magnetic force generated at the magnet 115.

Figure 4:
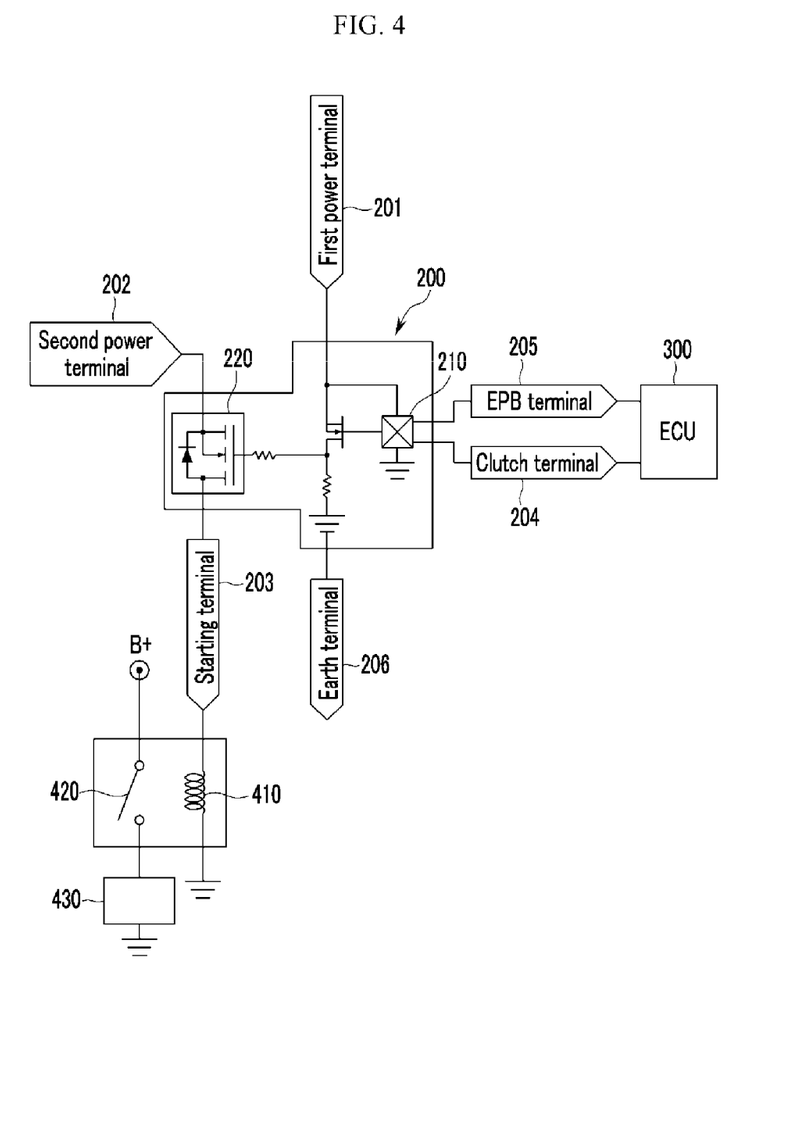
FIG. 4 is a circuit diagram illustrating an exemplary integrated sensor according to the present invention.
Figure 5:
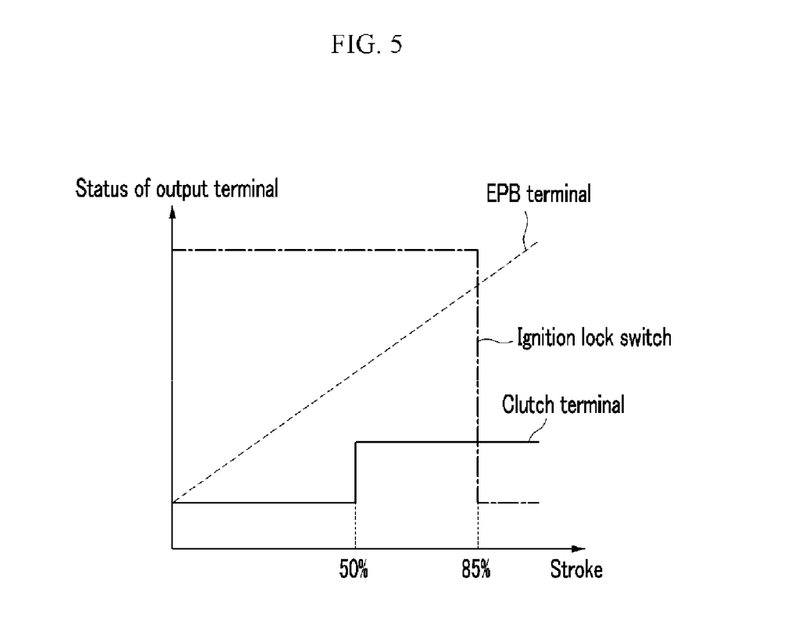
FIG. 5 is graph illustrating an output signal of a clutch terminal and an EPB terminal according to a stroke of a piston and on/off status of an ignition lock switch.

FIG. 4 is a circuit diagram illustrating an integrated sensor according to various embodiments of the present invention. FIG. 5 is graph illustrating an output signal of a clutch terminal and an EPB terminal according to a stroke of a piston and on/off status of an ignition lock switch.

In FIG. 5, a dotted line represents an amount of the stroke of the piston 113 output from an EPB terminal 205, a solid line represents a signal output from a clutch terminal 204, and a one-point chain line is on/off status of an ignition lock switch 220.

As shown in FIG. 4, the integrated sensor 200 includes the stroke sensor 210 detecting the stroke of the piston 113 provided in the clutch master cylinder 110, and the ignition lock switch 220 selectively supplying power to a starting motor 430 according to the stroke of the piston 113 detected by the stroke sensor 210.

A plurality of terminals such as six terminals for input and output of various signals are provided in the integrated sensor 200. The six terminals comprise a first power terminal 201 and a second power terminal 202 for supplying power, a starting terminal 203 connected to the ignition lock switch 220, the clutch terminal 204 for operation of the clutch, the EPB terminal 205 for operation of the EPB, and a ground terminal 206.

Power is supplied to the clutch terminal 204 and the EPB terminal 205 through the first power terminal 201, and power is supplied to the starting motor 430 through the second power terminal 202.

The integrated sensor 200 provides appropriate output to the starting motor 430 and an electronic control unit (ECU) 300 according to the stroke of the piston 113 detected by the stroke sensor 210.

Specifically, the amount of the stroke of the piston 113 is supplied to the ECU 300 through the EPB terminal 205. At this time, the amount of the stroke of the piston 113 may be converted to a voltage or current and supplied to the ECU 300.

The ECU 300 controls the EPB by using the amount of the stroke of the piston 113. The ECU 300 controls the EPB by using the stroke of the piston 113 and various other factors such as inclination of the vehicle.

The ECU 300 may be implemented with one or more microprocessors operated by a predetermined program or hardware including the microprocessor, and the predetermined program includes a series of commands for performing a driving method of a clutch operating system according to various embodiments of the present invention to be described below.

Power supplied to the ECU 300 is protected by the clutch terminal 204 when the stroke of the piston 113 reaches a first predetermined value. Here, the first predetermined value may be 50% of a full stroke of the piston 113.

As shown in FIG. 5, an output signal of the clutch terminal 204 maintains an on status when the stroke of the piston 113 is less than 50% of the stroke of the piston 113. However, the output signal of the clutch terminal 204 is converted to an off status when the stroke of the piston 113 is higher than 50% of full stroke of the piston 113.

In the prior art, the ECU 300 controls the transmission of the vehicle when the driver operates the clutch pedal 120 by using a mechanical clutch switch and the mechanical clutch switch is turned off. However, according to the present invention, the conventional mechanical clutch switch is substituted by the integrated sensor 200, thereby the number of parts and assembly time are reduced.

The ignition lock switch 220 provided in the integrated sensor 200 is turned on when the stroke of the piston 113 reaches a second predetermined value. Here, the second predetermined value may be 85% of a full stroke of the piston 113.

As shown in FIG. 5, when the stroke of the piston 113 reaches 85% of the full stroke of the piston 113, the ignition lock switch 220 is turned on and power supplied from the second power terminal 202 is supplied to the starting motor 430 through the starting terminal 203, and thereby the starting motor 430 is operated.

That is, when the ignition lock switch 220 is turned on, power supplied from the second power terminal is applied to a coil 410, and a power switch 420 is turned on. Therefore, power is supplied to the starting motor 430 from a battery.

Power supplied to the starting motor 430 is supplied by a second power terminal 202, and power supplied to the clutch terminal 204 and the EBP terminal is supplied through the first power terminal 201. At this time, since the first power terminal 201 and the second power terminal 202 receive power from separate power supply lines, power can be supplied through the clutch terminal 204 and the EPB terminal 205 after the engine starts.

Hereinafter, a driving method of the clutch operating system according to various embodiments of the present invention will be described.

Figure 6:
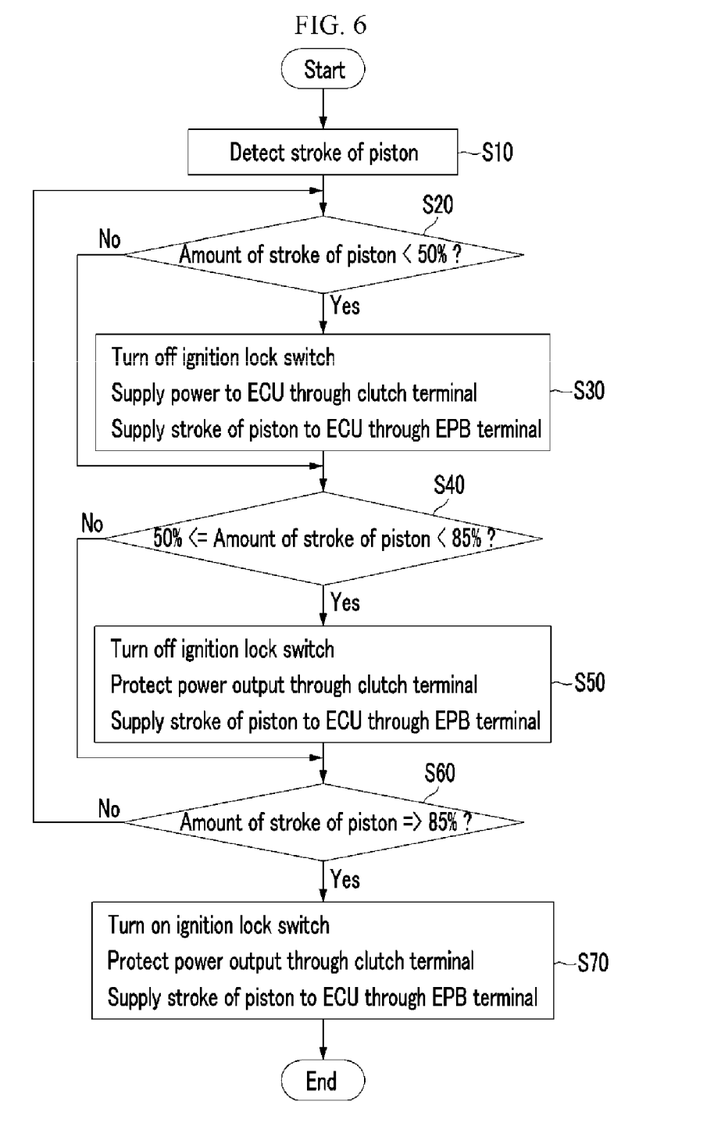
FIG. 6 is a flowchart illustrating an exemplary driving method of a clutch operating system according to the present invention.

FIG. 6 is a flowchart illustrating a driving method of a clutch operating system according to various embodiments of the present invention. As shown in FIG. 6, the stroke sensor 210 provided in the integrated sensor 200 measures the stroke of the piston 113 in the clutch master cylinder 110 at step S10.

The ignition lock switch 220 maintains an off status if the stroke of the piston 113 is less than 50% or about 50% of a full stroke of the piston 113, and the stroke of the piston 113 is supplied to the ECU 300 through the clutch terminal 204 and the EPB terminal 205.

If the stroke of the piston 113 is more than 50% or about 50% of a full stroke of the piston 113 and less than 85% or about 85% of a full stroke of the piston 113 at step S40, the ignition lock switch 220 maintains the off status and power supplied to the ECU 300 through the clutch terminal 204 is protected, and the detected stroke of the piston 113 is supplied to the ECU 300 through the EPB terminal 205 at step S50.

If the stroke of the piston 113 is more than 85% or about 85% of a full stroke of the piston 113 at step S60, the ignition lock switch 220 is converted to the on status and power is supplied to the starting motor 430 through the second power terminal 202. Therefore, power supplied to the ECU 300 through the clutch terminal 204 is protected. The detected stroke of the piston 113 is supplied to the ECU 300 through the EPB terminal 205 at step S70.

According to various embodiments of the present invention, an ignition lock switch, a clutch switch, and a stroke sensor are electrically integrated into one integrated sensor, such that the number of parts and assembly time can be reduced and manufacturing cost can be reduced. Further, since an ignition lock switch and a clutch switch made of a mechanical switch can be removed, operation noise generated at the ignition lock switch and the clutch switch can be minimized.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A clutch operating system comprising:
   a clutch master cylinder connected to a clutch pedal and generating hydraulic pressure by operation of the clutch pedal;
   a piston provided in the clutch master cylinder and reciprocally moving in the clutch master cylinder according to the operation of the clutch pedal; and
   an integrated sensor provided at the clutch master cylinder, and comprising:
      a stroke sensor for detecting a stroke of the piston by detecting a magnetic force generated at a magnet provided in the piston;
      an ignition lock switch for selectively supplying power to a starting motor according to the stroke of the piston detected by the stroke sensor;
      a starting terminal connected to the ignition lock switch;
      an electronic parking brake terminal for providing the stroke of the piston to an electronic control unit to control an electronic parking brake;
      a clutch terminal for supplying power to the electronic control unit;
      a first power terminal for supplying power to the electronic parking brake terminal and the clutch terminal; and
      a second power terminal for supplying power to the starting terminal;
   wherein the first and second power terminals receive power from separate power supply lines, thereby providing power to the electronic control unit through the clutch terminal after starting an engine.

2. The clutch operating system of claim 1, wherein when the stroke of the piston detected by the integrated sensor reaches a first predetermined value, power is supplied through the first power terminal, and the ignition lock switch is off.

3. The clutch operating system of claim 2, wherein the first predetermined value is 50% of a full stroke of the piston.

4. The clutch operating system of claim 1, wherein when the stroke of the piston detected by the integrated sensor reaches a second predetermined value, the ignition lock switch receives power through the second power terminal and turns on to supply the power to the starting motor through the starting terminal.

5. The clutch operating system of claim 4, wherein the second predetermined value is 85% of a full stroke of the piston.

\* \* \* \* \*